US012726575B2

(12) United States Patent
Tsuchiya

(10) Patent No.: US 12,726,575 B2
(45) Date of Patent: Sep. 1, 2026

(54) INFORMATION PROCESSING APPARATUS AND DISPLAY CONTROL METHOD

(71) Applicant: CANON KABUSHIKI KAISHA, Tokyo (JP)

(72) Inventor: Nao Tsuchiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 18/603,350

(22) Filed: Mar. 13, 2024

(65) Prior Publication Data

US 2024/0348731 A1 Oct. 17, 2024

(30) Foreign Application Priority Data

Apr. 14, 2023 (JP) ................................. 2023-066378

(51) Int. Cl.
*G06F 3/0482* (2013.01)
*G06F 3/04845* (2022.01)
*H04N 1/00* (2006.01)

(52) U.S. Cl.
CPC ..... *H04N 1/00474* (2013.01); *G06F 3/04845* (2013.01); *H04N 1/00413* (2013.01)

(58) Field of Classification Search
CPC ................................................. G06F 3/048–05
See application file for complete search history.

(56) References Cited

U.S. PATENT DOCUMENTS 8,654,381 B2 * 2/2014 Kurumasa ............ H04N 1/0035 358/1.14
2008/0148182 A1 * 6/2008 Chiang ................. G06F 3/0482 715/810
2013/0111412 A1 * 5/2013 Sura ...................... G06F 3/0482 715/845
2016/0334985 A1 * 11/2016 Yu ....................... G06F 3/04817
2017/0277395 A1 * 9/2017 Suo ..................... G06F 3/04817
2017/0300186 A1 * 10/2017 Kuhar ................... G06F 3/0482
2017/0364673 A1 * 12/2017 Gupta ................. G06F 3/04883
2019/0065876 A1 * 2/2019 Chu ........................ G06F 21/32
2020/0285745 A1 * 9/2020 Chen ..................... G06F 3/0488
2021/0286510 A1 * 9/2021 Tyler ..................... G06F 3/0481

FOREIGN PATENT DOCUMENTS

JP 2017058887 A 3/2017

* cited by examiner

*Primary Examiner* — Daniel Rodriguez
(74) *Attorney, Agent, or Firm* — Venable LLP

(57) ABSTRACT

An information processing apparatus obtains information on functions executable on a display target screen. Then, the information processing apparatus hides a first area for a first function that is restricted among the functions in a layout region where to place areas for the respective functions on the screen and displays a second area for a second function that is not restricted in the layout region while changing a size of the second area.

18 Claims, 8 Drawing Sheets

INFORMATION PROCESSING APPARATUS AND DISPLAY CONTROL METHOD

BACKGROUND OF THE INVENTION

Field of the Invention

The present disclosure relates to an information processing apparatus and a display control method.

Description of the Related Art

An information processing apparatus such as a multifunction apparatus uses a graphical user interface (abbreviated as GUI) screen. A user inputs information through the GUI screen. On the GUI screen, areas each having a predetermined function such, for example, as buttons are placed. The user is enabled to make a setting of a desired function by pressing down an area, for example, a button in order to perform image processing or set a destination.

Japanese Patent Laid-open No. 2017-58887 describes a technique in which in the case where a screen size or screen resolution on a display panel is changed, a display region is scaled up or down depending the changed screen size or screen resolution, and the size or the number of UI components is increased or reduced in the display region thus scaled up or down.

There is a need to improve the viewability of a GUI screen.

SUMMARY OF THE INVENTION

An information processing apparatus comprising: one or more memories storing instructions; and one or more processors executing the instructions to: obtain information on functions executable on a display target screen; and hide a first area for a first function that is restricted among the functions in a layout region where to place areas for the respective functions on the screen, and display a second area for second function that is not restricted in the layout region while changing a size of the second area.

Further features of the present invention will become apparent from the following description of exemplary embodiments with reference to the attached drawings.

DESCRIPTION OF THE EMBODIMENTS

Hereinafter, embodiments of the present disclosure will be described in detail in reference to the accompanying drawings. The following embodiments are not intended to limit the matters disclosed in the present disclosure. In addition, all the combinations of features described in the following embodiments are not necessarily essential for the solution of the present disclosure. The same structures will be described with the same reference sign.

First Embodiment

An information processing apparatus has multiple functions. On a GUI screen of the information processing apparatus, user interface components (abbreviated as UI components) each being an area having a function such, for example, as a button are placed. For example, considered is a case where the information processing apparatus has a first function and a second function and a first UI component for executing the first function and a second UI component for executing the second function are displayed on a display screen. Here, depending on a used mode, a use restriction may be imposed on the first function. In this case, in order to clearly inform a user that the user is disabled from executing the first function, the information processing apparatus is sometimes controlled so that the first UI component for executing the first function is hidden. As a result, the first UI component is hidden and only the second UI component is displayed on the display screen. However, if the first UI component is simply hidden, the GUI viewability may decrease. In the following embodiment, an example of improving the GUI viewability will be described. In addition, an example of also improving the operability as a result of improving the viewability will be described.

The present embodiment will be described by taking, as an example of the information processing apparatus, an image processing apparatus, that is, a multifunction apparatus having a printing function.

<Hardware Configuration of Image Processing Apparatus>

Figure 1:
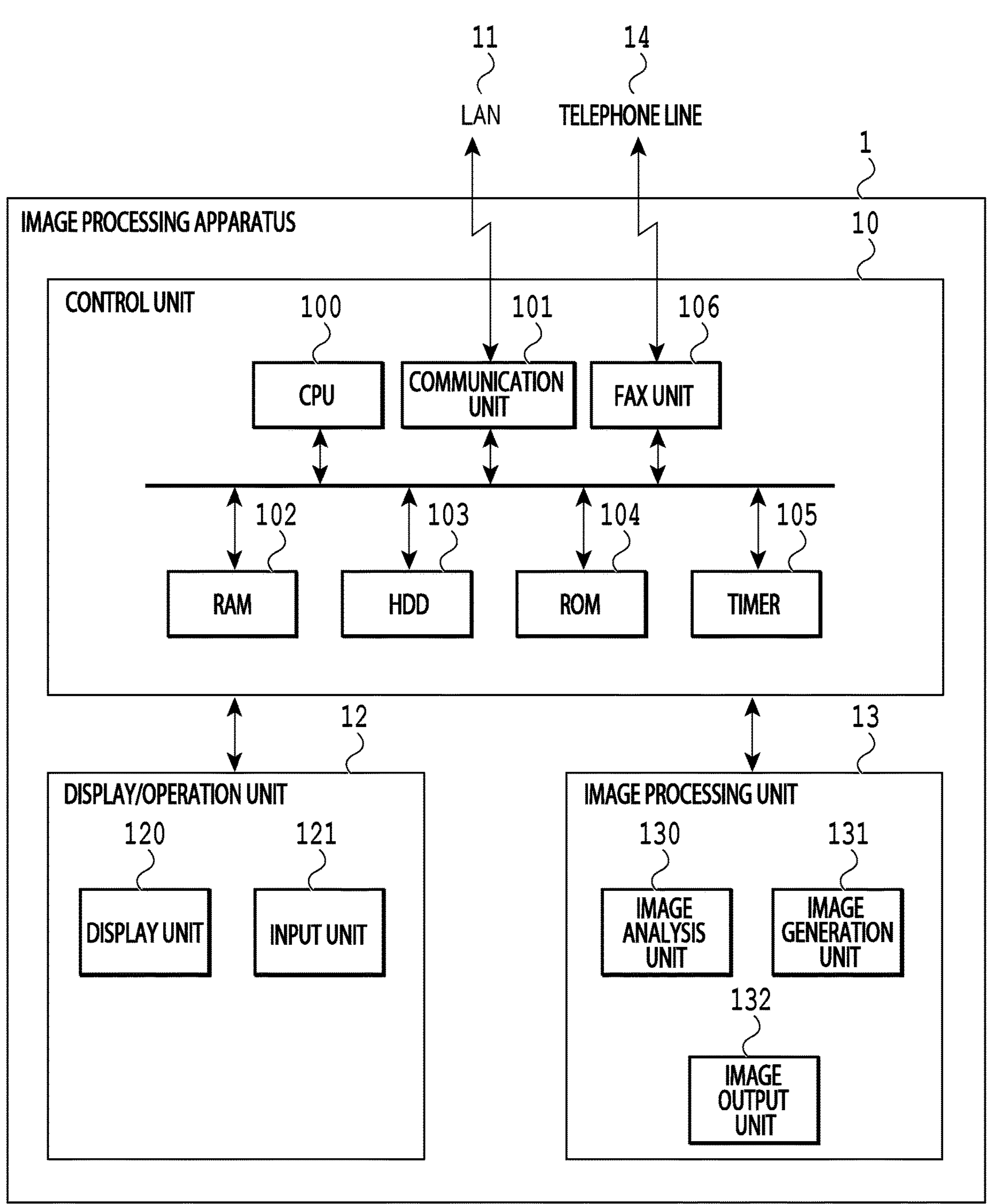
FIG. 1 is a block diagram for explaining a hardware configuration of an image processing apparatus.

FIG. 1 is a block diagram for explaining a hardware configuration of an image processing apparatus 1 according to the present embodiment. The image processing apparatus 1 includes a control unit 10, a display/operation unit 12, and an image processing unit 13.

The control unit 10 controls operations of the units in the image processing apparatus 1. The control unit 10 includes a CPU 100, a communication unit 101, a RAM 102, an HDD 103, a ROM 104, a timer 105, and a FAX unit 106. The CPU 100 performs overall control of the control unit 10. The communication unit 101 performs data transmission and reception through a LAN 11. The LAN 11 means a network for exchanging data with external apparatuses and the image processing apparatus 1 is connected to the Internet through the LAN 11. The RAM 102 provides a system work memory for the CPU 100 to operate. The HDD 103 is a hard disk drive. Here, instead of the HDD 103, any one or any combination of other storage devices such, for example, as a magnetic disk, an optical medium, and a flash memory may be used. The HDD 103 can store job data, setting data, and so on. The HDD 103 does not have to be provided in the image processing apparatus 1. For example, as the storage device, an external server, a personal computer, or the like may be used through the communication unit 101.

The ROM 104 is a boot ROM and stores a boot program for the system. In accordance with the boot program in the ROM 104, the CPU 100 develops a program installed in the HDD 103 onto the RAM 102 and performs various types of controls based on the program. The timer 105 measures a lapse of time according to an instruction from the CPU 100 and issues an interrupt or the like upon a lapse of an instructed period of time to inform the CPU 100 of that. The FAX unit 106 transmits and receives facsimile data through a telephone line 14.

The display/operation unit 12 is controlled by the control unit 10 and includes a display unit 120 and an input unit 121. The display unit 120 is a display for displaying information on the image processing apparatus 1 to a user. The display unit 120 is configured to be able to display a display screen as will be described later. The input unit 121 is configured to be able to receive inputs from the user through an interface such, for example, as a touch panel, a mouse, a camera, a voice input, or a keyboard.

The image processing unit 13 is controlled by the control unit 10 and includes an image analysis unit 130, an image generation unit 131, and an image output unit 132. The image analysis unit 130 analyzes a structure of an original image and extracts necessary information from an analysis result. The image generation unit 131 generates image data of an original copy by digitizing an image of the original copy through reading (for example, scanning) of the original copy, and stores the image data into the HDD 103. The image generation unit 131 is able to also generate image data of the original copy in another format by using the information obtained by the analysis of the image analysis unit 130. The image output unit 132 outputs the image data stored in the HDD 103 or the like. A method of outputting the image data is, for example, to print the image data of the original copy onto a sheet. Another method of outputting the image data is to transmit the image data via the communication unit 101 to an external device, server, or facsimile machine connected to the network or to store the image data into a storage medium connected to the image processing apparatus 1.

The configuration illustrated in FIG. 1 is just an example, and the information processing apparatus should not be limited to this example. As will be described later, the information processing apparatus in the present embodiment may be applied to any type of apparatus as long as the apparatus is configured to be able to display a display screen including UI components for executing functions and hide the UI component for any of the functions if the function is restricted. Here, to restrict a function means a state where the function is disabled from being executed. More specifically, to restrict a function A does not mean to disable execution of part of the function A but means to disable execution of the entire function A.

<Software Configuration of Image Processing Apparatus>

Figure 2:
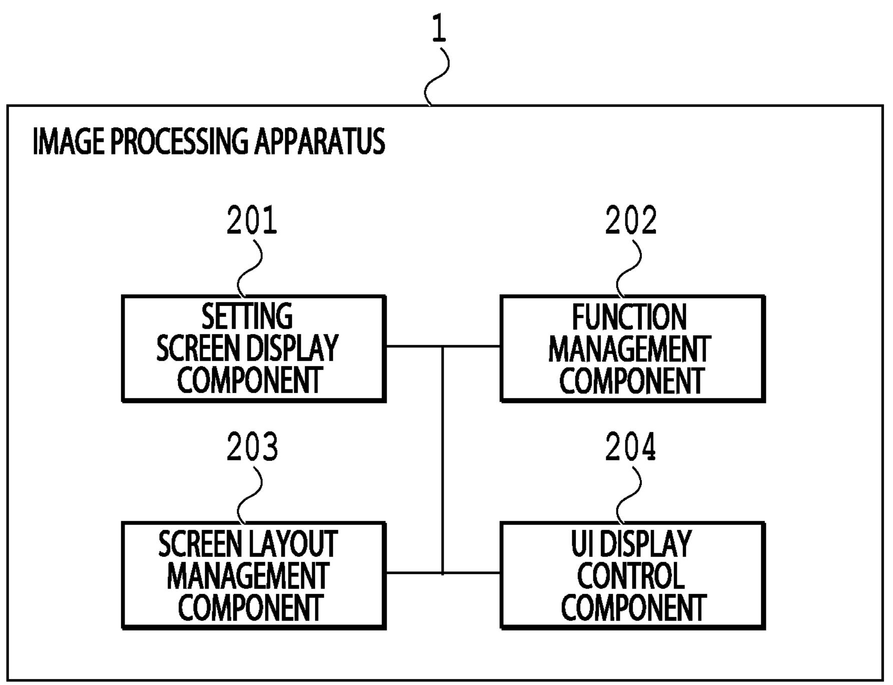
FIG. 2 is a diagram illustrating an example of a software configuration of the image processing apparatus.

FIG. 2 is a diagram illustrating an example of a software configuration of the image processing apparatus 1. The image processing apparatus 1 includes a setting screen display component 201, a function management component 202, a screen layout management component 203, and a UI display control component 204. These parts are functional parts that the CPU 100 implements by developing a program installed in the HDD 103 onto the RAM 102 in accordance with the boot program in the ROM 104 and executing the program.

The setting screen display component 201 performs a process of displaying a setting screen and a process of closing the setting screen. The function management component 202 manages functions usable on the setting screen. The screen layout management component 203 manages the layout of UI components to be displayed to a user. The UI display control component 204 controls whether or not to display UI components to be laid out in the same region by the screen layout management component 203. In addition, the UI display control component 204 performs a process of, depending on the number of UI components to be displayed in one and the same region, dividing the region and changing (scaling) the size of each UI component.

<Flowchart and Menu Screen>

Figure 3:
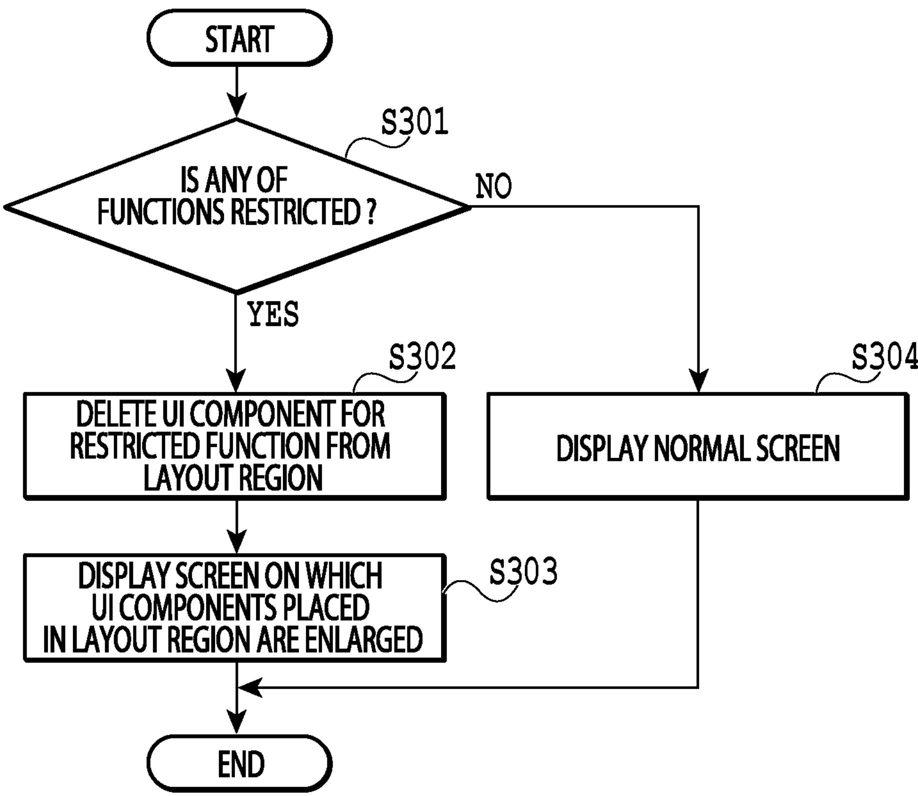
FIG. 3 is a diagram of a flowchart presenting an example of processing.
Figure 4A:
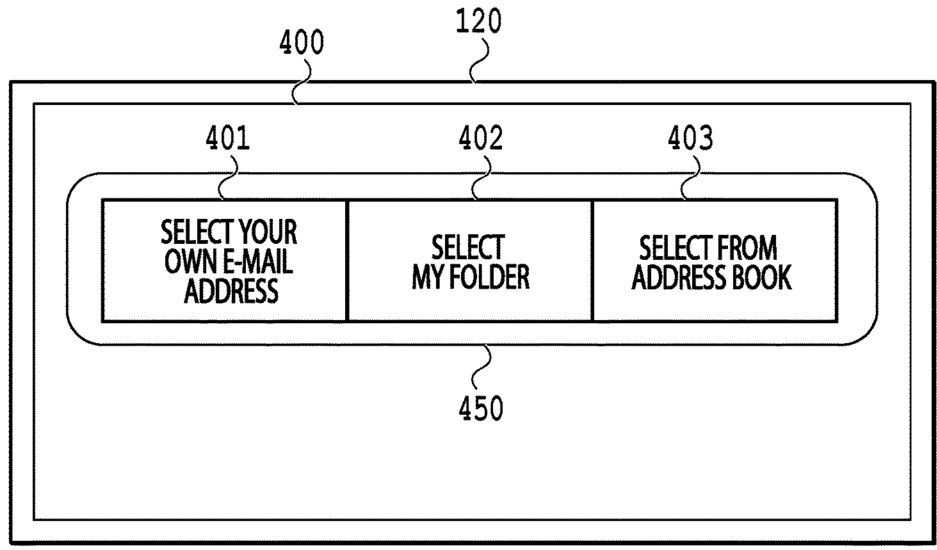
FIGS. 4A to 4C are diagrams illustrating examples of display screens.
Figure 4B:
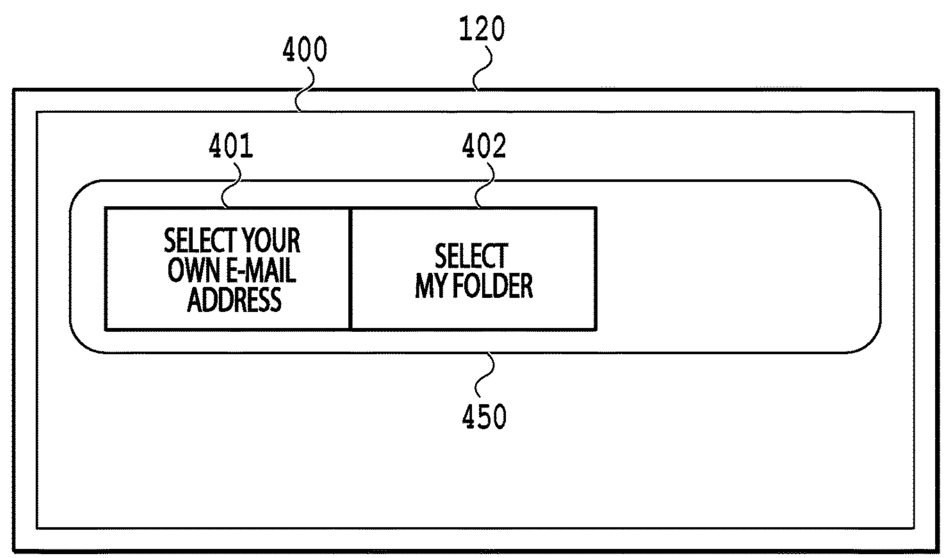
Figure 4C:
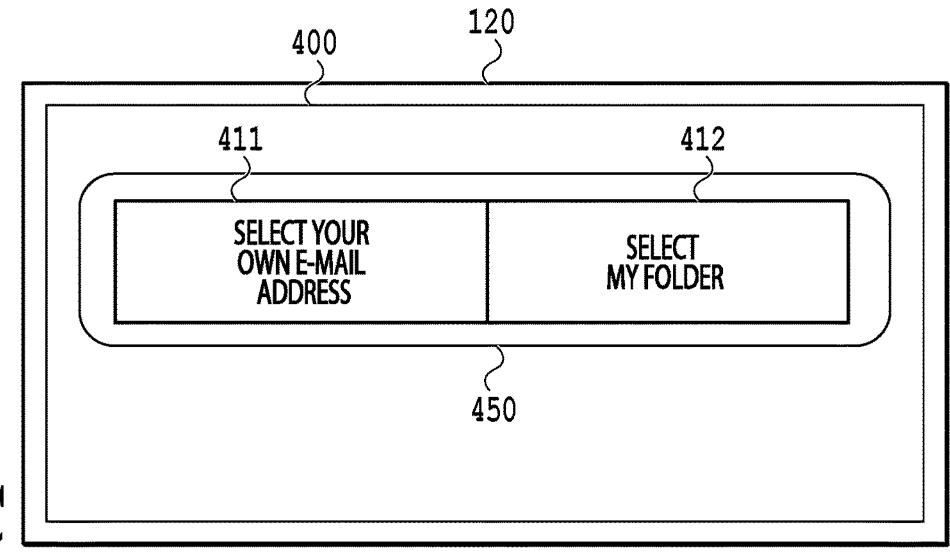

FIG. 3 is a diagram of a flowchart presenting an example of processing in the present embodiment. FIGS. 4A to 4C are diagrams illustrating examples of display screens displayed on the display unit 120 of the image processing apparatus 1. The processing presented in FIG. 3 is implemented by the CPU 100 reading a program stored in the ROM 104 and executing the program. In other words, the processing presented in FIG. 3 is implemented by the CPU 100 functioning as the components illustrated in FIG. 2. Note that some or all of functions at steps in FIG. 3 may be implemented by hardware such as an ASIC or an electronic circuit. In the following description of each process, sign "S" indicates a step in the flowchart (hereinafter the same applies to all the flowcharts in the present specification).

The flowchart presented in FIG. 3 is executed by the CPU 100 in response to reception of an instruction to display a screen including UI components for setting or executing functions. The present embodiment will be described by taking an address selection function as an example of a function. The address selection function is a function to select a transmission destination of, for example, image data obtained by scanning with the image processing apparatus 1. In addition to the case of scanning, the address selection function is used for selecting a transmission destination of any data handled in the image processing apparatus 1. For example, the address selection function may be configured to allow a selection of a transmission destination of data received through the FAX.

At S301, for displaying a display screen as a trigger for the processing in FIG. 3, the function management component 202 determines whether or not a function group to be displayed on the display screen includes a function whose use is restricted. In other words, the function management component 202 determines whether any of the functions included in the functional group is restricted or not. For example, the function management component 202 may refer to information in which each mode of the image processing apparatus 1 is associated with a list of functions to be restricted and determine whether any of the functions is restricted or not depending on the current mode of the image processing apparatus 1. If the function management component 202 determines that any of the functions is restricted, the CPU 100 proceeds to S302. If the function management component 202 determines that none of the functions is restricted, the CPU 100 proceeds to S304.

At S302, the UI display control component 204 obtains layout information for the display screen as a display target from the screen layout management component 203. The layout information contains information on a layout region where to place the UI components on the display screen and information on relative layout positions of the UI components in the layout region. The UI display control component 204 identifies the layout of the UI component for the function determined to be restricted at S301 (hereinafter referred to as the restricted function) based on the obtained layout information. Then, the UI display control component 204 controls the display of the display screen such that the UI component for the restricted function is hidden. Specifically, the UI display control component 204 performs the control to delete the UI component for the restricted function from the layout region. As a result, the UI component for the restricted function is excluded (undisplayed) in the layout region.

Next, at S303, the UI display control component 204 displays the screen on which the UI components placed in the layout region are enlarged. For example, the UI display control component 204 identifies the number of the UI components to be placed in the layout region from the layout information. Then, the UI display control component 204 divides the layout region into areas depending on the number of the UI components to be placed in the layout region. Here, the UI component for the restricted function is deleted from the layout region and therefore is excluded from the above number. The UI display control component 204 scales up each of the UI components to be placed in the layout region according to the size of the divided area. The setting screen display component 201 displays the UI components scaled up by the UI display control component 204 on the display unit 120. Then, the CPU 100 terminates the processing of the flowchart presented in FIG. 3.

On the other hand, if the function management component 202 determines that none of the functions is restricted at S301, the CPU 100 displays a normal screen at S304. In other words, at S304, the setting screen display component 201 displays a default screen for the display screen as the display target. Then, the CPU 100 terminates the processing of the flowchart presented in FIG. 3. At S304, an example of a first process of displaying the default screen is described, but a second process may be performed which includes dividing the layout region into areas depending on the number of components to be placed based on the layout information, and displaying each UI component changed to be fit to the size of the corresponding area. In the present example, the same screen is configured as a result of both of the first process and the second process, but different screens may be configured as a result of the first process and the second process.

Specific examples of display screens will be described by using FIGS. 4A to 4C. Since the present embodiment uses the address selection function as the example of the function as described above, FIGS. 4A to 4C illustrate examples of an address selection screen. However, the screen should not be limited to these.

FIG. 4A is a diagram illustrating an example of an address selection screen 400 displayed on the display unit 120. The address selection screen 400 includes a designation region 450 for designating a destination. In the present embodiment, the designation region 450 serves as a layout region where to place UI components. The designation region 450 is provided across the entire width of a display region displayable on the display unit 120. The size of the designation region 450 is fixed. In the example of FIG. 4A, only the designation region 450 is displayed as an example, but any other region may be displayed.

In the example of FIG. 4A, three functions are provided as the address selection function and include no restricted function. In other words, FIG. 4A is the example in which the normal screen at S304 is displayed. The address selection function in FIG. 4A includes the three functions of selecting your own e-mail address, selecting my folder, and selecting a destination from an address book. In FIG. 4A, there are displayed a first UI component 401 for the function of “selecting your own e-mail address”, a second UI component 402 for the function of “selecting my folder”, and a third UI component 403 for the function of “selecting a destination from the address book”. The function of “selecting your own e-mail address” is a function of setting, as a destination, a personal e-mail address set by an operator of the image processing apparatus 1. The function of “selecting my folder” is a function of setting, as a destination, a personal folder set by the operator of the image processing apparatus 1. The function of “selecting a destination from the address book” is a function of setting a destination from the address book. In the present embodiment, the UI components are displayed as button icons for selecting these functions. Each of the UI components contains a text for explaining the corresponding function. FIG. 4A illustrates the example of the normal screen on which the UI components are placed in the respective three areas into which the designation region 450 is divided, but the normal screen is not limited to this example. The normal screen may be a screen on which UI components are placed in the designation region 450 such that one or some of the UI components are different in size from the other UI components.

By touching the display area of a desired UI component, the user is enabled to execute the corresponding function. For example, by touching the first UI component 401 for the function of “selecting your own e-mail address”, the user is enabled to set user’s own e-mail address as a destination. After that, if the user touches, for example, a scan execution button, not illustrated, scanned data is transmitted to the set e-mail address.

FIG. 4B is a diagram illustrating an example of an address selection screen 400 in a comparative example different from the present embodiment. FIG. 4B is the diagram illustrating the screen on which a restricted function is included in the address selection screen 400. If any function is restricted, the UI screen is controlled such that the user is disabled from selecting the function. The comparative example illustrated in FIG. 4B illustrates the example in which the function of “selecting a destination from the address book” in FIG. 4A is restricted. The comparative example illustrates the example in which the third UI component 403 for the restricted function is controlled to be deleted from and hidden in the designation region 450. In the comparative example of FIG. 4B, an unnatural space is left at the area where to place the third UI component 403 in the layout region. In another comparative example, the UI component for the restricted function may be controlled to be hidden by being grayed out in the designation region 450. In this case, the region in which the user is allowed to operate is reduced more than necessary.

FIG. 4C is a diagram illustrating an example of the address selection screen 400 in the present embodiment. FIG. 4C illustrates the example in which the function of “selecting a destination from the address book” in FIG. 4A is restricted as in the case of FIG. 4B. As described in the processing in FIG. 3, the processes of deleting the third UI component 403 for the restricted function from the layout region, that is, the designation region 450, and then scaling up the remaining UI components to be displayed according to the layout region. As a result, as illustrated in FIG. 4C, the UI components are placed across the entire designation region 450. Since the UI components thus placed extend across the entire designation region 450, a range which can be selected by the user is also provided across the entire designation region 450. This makes it possible to improve the viewability by the user operating the image processing apparatus 1 and additionally also improve the operability.

Hereinafter, a specific example of the processing will be described in reference to FIGS. 3, 4A, and 4C. In the following example, the image processing apparatus 1 is set in advance to have a function restricted. In the present embodiment, under a condition where a mode in the image processing apparatus 1 is a user mode, one of the functions is set to be restricted. Such function restriction is imposed in order that an administrator of the image processing apparatus 1 can properly make settings.

In this example, the administrator of the image processing apparatus 1 previously makes a setting to prohibit (restrict) the use of the function of selecting a destination from the address book in the case of the user mode. In this state, if the CPU 100 receives an instruction to shift to the display of the address selection screen 400 while the image processing apparatus 1 is operating in the user mode, the processing in FIG. 3 is started.

In this example, since the restricted function exists, the function management component 202 obtains the information indicating that the function of selecting a destination from the address book is restricted at S301. Then, at S302, the UI display control component 204 obtains the layout information for the display screen as the display target. At S302, the third UI component 403 for the restricted function is deleted from the layout region, and accordingly the number of UI components to be included in the designation region 450 is decreased from three to two.

At S303, the UI display control component 204 scales up the UI components to be placed in the designation region 450. As a result, the first UI component 401 illustrated in FIG. 4A is changed in size to a scaled-up first UI component 411 illustrated in FIG. 4C. Similarly, the second UI component 402 illustrated in FIG. 4A is changed in size to a scaled-up second UI component 412 illustrated in FIG. 4C. The scaled-up first UI component 411 is placed at an area including at least part of the area where to place the second UI component 402 in the designation region 450. The scaled-up second UI component 412 is placed at an area including at least part of the area where to place the third UI component 403 in the designation region 450. Then, the setting screen display component 201 displays the screen using the UI components thus placed, so that the address selection screen 400 illustrated in FIG. 4C is displayed on the display unit 120.

In the example illustrated in FIG. 4C, the screen on which the size of the button icons constituting the UI components is scaled up but the size of the texts is not scaled up is illustrated as a non-limiting example. The size of the text included in each UI component may be also scaled up according to the scaleup of the button icon constituting the UI component. Moreover, the scaling factors of the text and the button icon may be the same or different.

In the present embodiment, the example in which the use of the address book is restricted in the case of the user mode is described. However, a function to be restricted in the case of the user mode can be set as appropriate by the administrator of the image processing apparatus 1 as described above.

In the present embodiment, the address selection function is described as one example of the function. However, the function is not limited to this example, and the present disclosure may be applied to any function. Moreover, in the present embodiment, the example of the setting function (in other words, the example of setting the destination) is described as a non-limiting example. In one example, the function may be an execution function. For example, in one possible embodiment, a UI component for executing a copy function, a scan function, or a FAX function is provided in a menu screen. Then, for example, in the case of a state or mode where communication is disabled, the FAX function may be restricted. In this case, the UI component for executing the FAX function in the menu screen may be deleted and the UI components for executing the copy function and the scan function may be scaled up and displayed in the menu screen.

The present embodiment is described by using the example in which the UI component is first deleted from the layout region and then the remaining UI components are equally scaled up, but the remaining UI components do not necessarily have to be scaled up equally. After the third UI component is deleted, the remaining first UI component may be scaled up at a first scaling factor, and the remaining second UI component may be scaled up at a second scaling factor different from the first scaling factor.

In the present embodiment, a combination of the example in which the three UI components are to be placed in the layout region on the normal screen and the example in which one UI component for the restricted function exists is described as a non-limiting example. Any configuration may be employed as long as at least one function in a function group including multiple functions is restricted. For example, two functions for two UI components among three UI components may be restricted or a function for one UI component out of two UI components may be restricted. Instead, a function for one UI components among four UI components may be restricted.

According to the present embodiment, the viewability of the GUI screen can be improved as described above. Specifically, in the present embodiment, if there is a function restricted, the control is performed such that the UI component for implementing the function is excluded. Then, the sizes of the other UI components are changed such that the other UI components are placed in the area where to place the UI component for the restricted function. With this processing, the region where the user can select any of the other UI components is expanded. Thus, the viewability of the user can be improved. In addition, the operability of the user can be also improved.

Second Embodiment

In the first embodiment, the example of restricting one function in the function group including the multiple functions is described. Specifically, in the example in which the three UI components are to be placed in the layout region on the normal screen, the example in which one UI component for the restricted function exists is described. In the present embodiment, an example in which all functions to be placed in a layout region are set as restricted functions will be described. Since the image processing apparatus 1 has the same configuration as the configuration described in the first embodiment, the configuration is omitted from the description. Hereinafter, mainly different points from those in the first embodiment will be described.

Figure 5:
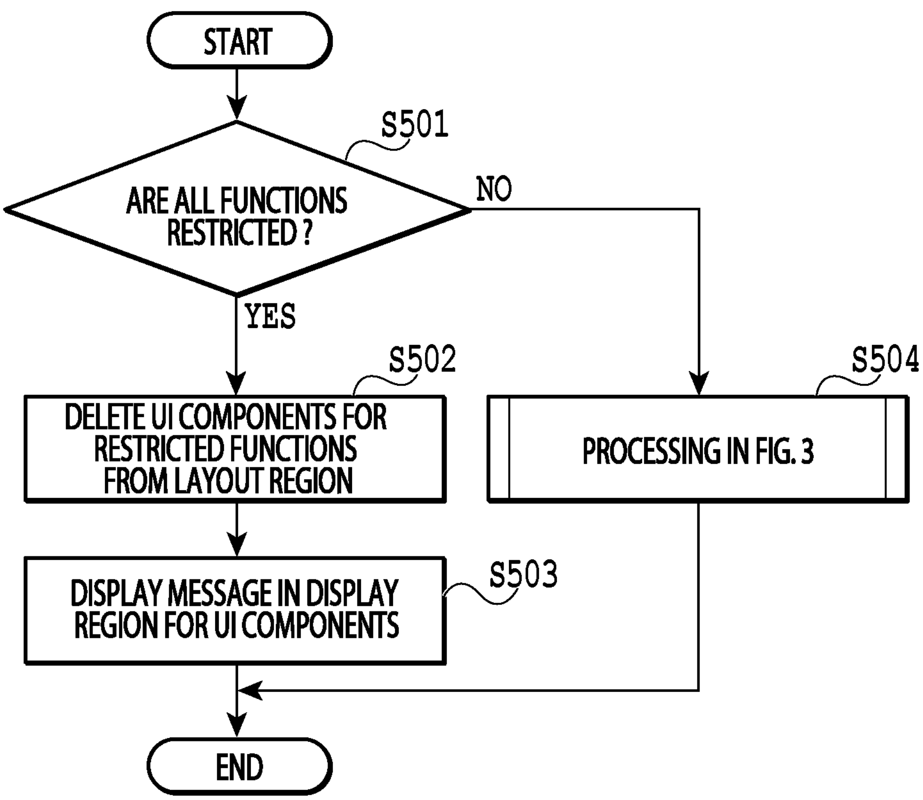
FIG. 5 is a diagram of a flowchart presenting an example of processing.
Figure 6:
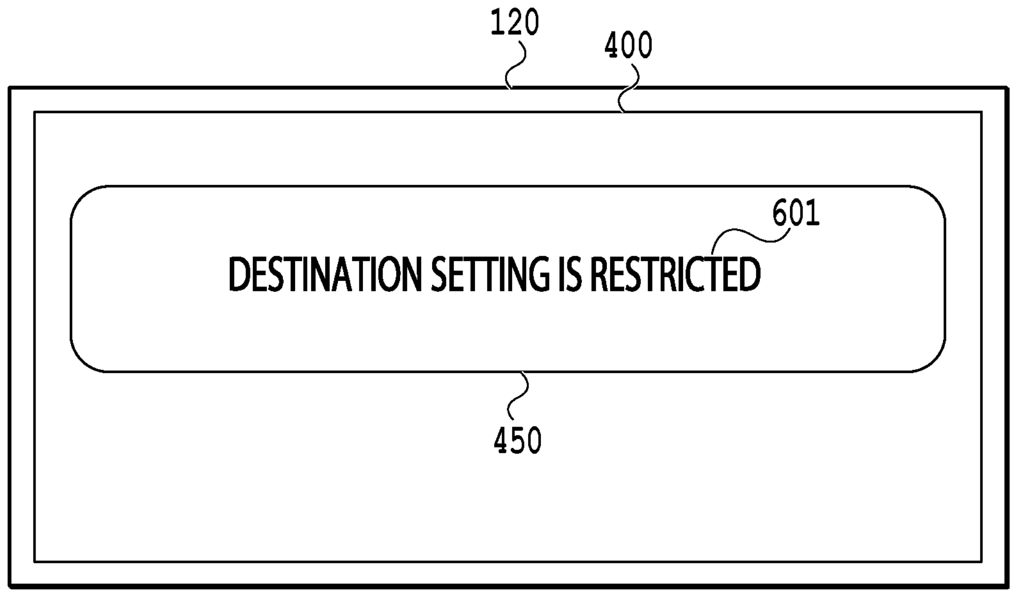
FIG. 6 is a diagram illustrating an example of a display screen.

FIG. 5 is a diagram of a flowchart presenting an example of processing in the present embodiment. FIG. 6 is a diagram illustrating an example of a display screen displayed on the display unit 120 of the image processing apparatus 1. As is the case with the flowchart presented in FIG. 3, the flowchart presented in FIG. 5 is executed by the CPU 100 in response to reception of an instruction to display a screen including UI components for setting or executing functions.

At S501, for displaying a display screen as a trigger for the processing in FIG. 5, the function management component 202 determines whether use of all functions in a function group to be displayed on the display screen is restricted or not. In other words, at S501, the function management component 202 determines whether all the functions are restricted or not. If the function management component 202 determines that all the functions are restricted, the CPU 100 proceeds to S502. If the function management component 202 determines that none of the functions is restricted, the CPU 100 proceeds to S504. At S504, the processing in the flowchart described in FIG. 3 in the first embodiment is executed. After the processing at S504 is completed, the CPU 100 terminates the processing of the flowchart in FIG. 5.

At S502, the UI display control component 204 obtains the layout information for the display screen as the display target from the screen layout management component 203. Then, the UI display control component 204 controls the display of the display screen such that the UI components for the restricted functions are hidden. In other words, the UI display control component 204 performs the control to delete the UI components for all the functions from the layout region. As a result, the UI components for the restricted functions are excluded (undisplayed) in the layout region.

Next, at S503, the UI display control component 204 places a predetermined message in the layout region on the display screen as the display target. The setting screen display component 201 displays the message placed by the UI display control component 204 on the display unit 120. Then, the CPU 100 terminates the processing of the flowchart presented in FIG. 5.

On the address selection screen 400 in FIG. 6, no UI component is displayed in the designation region 450. In other words, on the address selection screen 400 in FIG. 6, the user is disabled from selecting any destination. In order to inform the user of this state, a message 601 indicating that the functions are restricted is displayed in the designation region 450. In this case, the message indicating that the destination setting is restricted is displayed. If the UI components for all the functions are just deleted from the designation region 450, nothing is displayed in the designation region 450. In this case, there is a high possibility that the user cannot determine what state the image processing apparatus 1 is in. For this reason, in the present embodiment, the predetermined message 601 is displayed in the case where all the functions are restricted. Thus, the usability can be improved. In the present embodiment, the predetermined message 601 is displayed in the designation region 450 as a non-limiting example. The message 601 may be displayed at any position designated by the screen layout management component 203. In other words, the predetermined message 601 may be displayed outside the designation region 450. Alternatively, the predetermined message 601 may be displayed in a form extending from the inside to the outside of the designation region 450. The displayed message 601 may be closed in response to an operation by the user or may be closed after the lapse of a predetermined period of time.

According to the present embodiment, the predetermined message is displayed in the case where all the functions are restricted as described above. This makes it possible to reduce physiological burden on the user and improve usability.

Third Embodiment

In the second embodiment, the example in which the predetermined message is displayed in the case where all the functions are restricted is described. The present embodiment is an embodiment in which a predetermined message is displayed also in the case where at least one of functions is restricted. The image processing apparatus 1 has the same configuration and performs the same processing as in the example described in the first embodiment. In the present embodiment, at S303 in FIG. 3, a process of displaying a predetermined message is additionally performed. The displayed message may be any message, and may be a message indicating that, for example, one of the functions is restricted. Instead, the message may be a message specifically indicating the restricted function. For example, in the example in FIG. 4C, a message that "the function of selecting a destination from the address book is restricted" may be displayed. The position of the displayed message may be any position. The displayed message may be closed in response to an operation by the user or may be closed after the lapse of a predetermined period of time. The third embodiment is described by using the example in combination with the first embodiment, but may be an embodiment in combination with the second embodiment.

According to the present embodiment, the predetermined message is displayed in the case where the function is restricted as described above. This makes it possible to reduce the possibility that the user may have a strange feeling by viewing the screen with a layout different from the normal screen.

Fourth Embodiment

In the foregoing embodiments, the example is described in which the UI components are scaled up and displayed according to a reduction in the number of UI components in the case where the function is restricted. In the present embodiment, an example is described in which the number of UI components is increased in the case where the restriction on the restricted function is canceled. In the following example, the sizes of the UI components already displayed are reduced in that case.

For example, as one of the address selection functions, there is a custom setting function of allowing designation of any desired destination address. Here, it is assumed that such a custom setting function is restricted in a normal use. In other words, it is assumed that the function is restricted from the beginning and this state is a normal state. In this case, if the restriction is canceled, that is, the custom setting function is enabled, a UI component for the custom setting function is added to the layout region. In this case, the sizes of the UI components already displayed are scaled down (reduced) according to an increase in the number of the UI components in the following example. Since the image processing apparatus 1 has the same configuration as in the example described in the first embodiment, the configuration is omitted from the description. Hereinafter, different points from those in the first embodiment will be described mainly.

Figure 7:
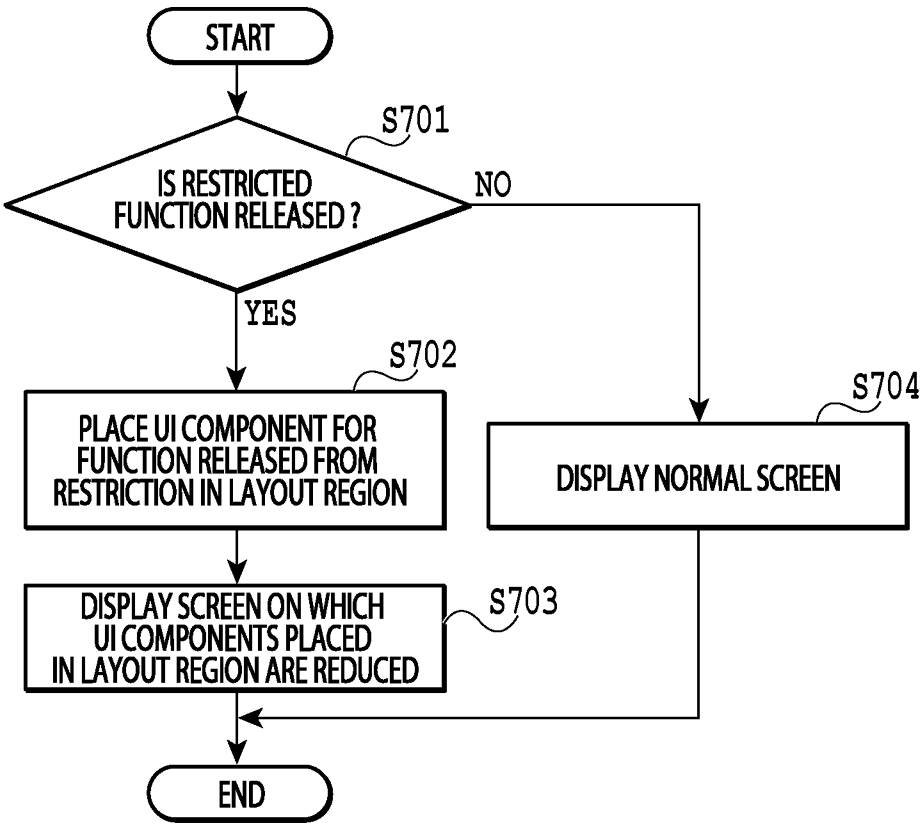
FIG. 7 is a diagram of a flowchart presenting an example of processing.
Figure 8A:
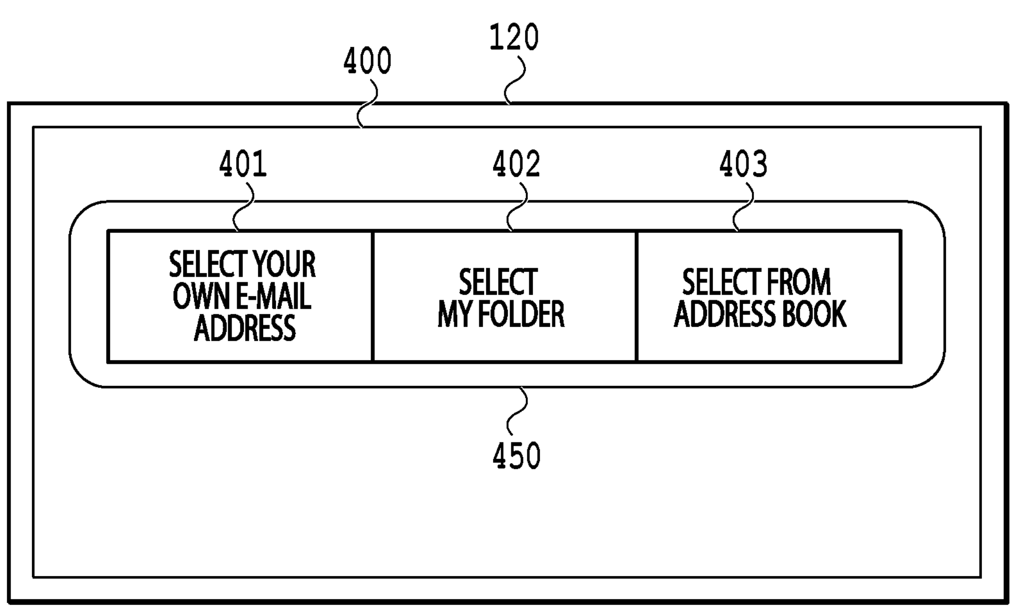
FIGS. 8A and 8B are diagrams illustrating examples of display screens.
Figure 8B:
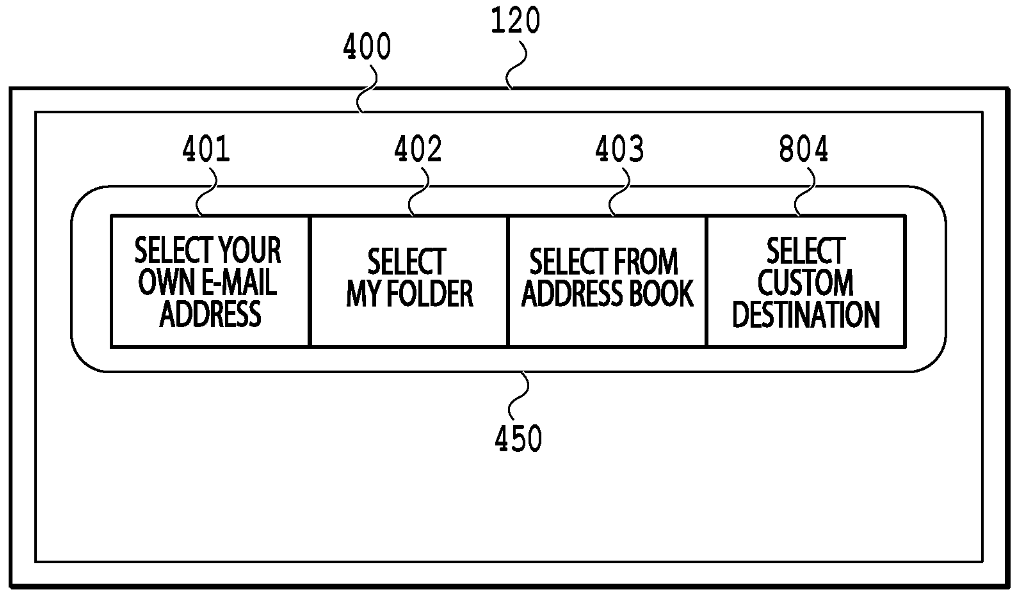

FIG. 7 is a diagram of a flowchart presenting an example of processing in the present embodiment. FIGS. 8A and 8B are diagrams illustrating examples of display screens displayed on the display unit 120 of the image processing apparatus 1. As is the case with the flowchart presented in FIG. 3, the flowchart presented in FIG. 7 is executed by the CPU 100 in response to reception of an instruction to display a screen including UI components for setting or executing functions.

At S701, for displaying a display screen as a trigger for the processing in FIG. 7, the function management component 202 determines whether the function restricted in the display screen is released or not. In the present embodiment, a screen displayed under a condition where a certain one of the functions is restricted is treated as a normal screen. If the function management component 202 determines that the restricted function is not released, that is, the certain function is restricted, the CPU 100 proceeds to S704. If the function management component 202 determines that the restricted function is released, the CPU 100 proceeds to S703. At S704, the CPU 100 displays the normal screen. Specifically, at S704, the setting screen display component 201 displays the default normal screen set for the display screen as the display target. Then, the CPU 100 terminates the processing of the flowchart presented in FIG. 7. FIG. 8A is an example of the normal screen in the present embodiment, and is the same screen as the screen illustrated in FIG. 4A.

At S702, the UI display control component 204 obtains the layout information for the display screen as the display target from the screen layout management component 203. Then, the UI display control component 204 performs control such that the UI component for the released function is displayed. Specifically, the UI display control component 204 performs the control of adding the UI component for the released function to the layout region in addition to the UI components already placed in the layout region. As a result, the UI component for the released function is placed (displayed) in the layout region.

Next, at S703, the UI display control component 204 displays the screen on which the UI components placed in the layout region on the display screen as the display target are reduced in size. For example, the UI display control component 204 identifies the number of the UI components to be placed in the layout region from the layout information. Then, the UI display control component 204 divides the layout region into areas depending on the number of the UI components to be placed in the layout region. The UI display control component 204 scales down each of the UI components to be placed in the layout region such that the UI component can be fit to the size of the divided area. The setting screen display component 201 displays the UI components scaled down by the UI display control component 204 on the display unit 120. Then, the CPU 100 terminates the processing of the flowchart presented in FIG. 7.

FIG. 8B illustrates an example of the screen displayed on the display unit 120 under the condition where the restricted function in FIG. 8A is released. While the designation region 450 is divided into three in FIG. 8A, the designation region 450 is divided into four in FIG. 8B. Then, a fourth UI component 804 representing the function of adding a custom destination is displayed. Here, in comparison between FIG. 8A and FIG. 8B, the sizes of the first UI component 401, the second UI component 402, and the third UI component 403 are smaller in FIG. 8B than in FIG. 8A.

The sizes of the texts are not reduced in the example in FIG. 8B but may be scaled as described in the first embodiment. Here, as the number of UI components added increases, the viewability of the text may decrease. For this reason, if the number of UI components to be placed in the designation region 450 is equal to or more than a predetermined number (for example, five), the screen may be configured such that only the button icons are displayed without text display.

In the present embodiment, the example is described in which the sizes of the UI components already displayed are reduced in the case where the restricted function is released. This processing corresponds to the second process described at S304 in the flowchart of FIG. 3 in the first embodiment. Specifically, if the function management component 202 determines that none of the functions is restricted at S301, the CPU 100 displays the normal screen at S304. The second process performed in this case by dividing the layout region into areas depending on the number of components to be placed based on the layout information, and displaying each UI component while the UI component is changed to be fit to the size of the corresponding area substantially corresponds to the processing described in the present embodiment. In the present embodiment, the example in which the UI components already displayed are reduced in size and displayed is described as a specific example of the above second process. The present embodiment may be applied in combination with the second embodiment or the third embodiment.

According to the present embodiment, by changing the display form of the UI components, the viewability can be improved and a deterioration of the operability can be suppressed.

Other Embodiments

In the foregoing embodiments, the examples are described in each of which the size of the layout region (the designation region 450) where to place the UI components on the display screen is not changed. In short, in the above examples, the viewability and operability of the UI components are improved within the predetermined layout region. Instead, in one possible embodiment, the size of the layout region may be changed. Also in this case, similarly, UI components just have to be displayed by being scaled up or down according to the number of the UI components to be placed in the layout region.

In addition, in each of the foregoing embodiments, the example in which the processing in the flowchart is started in response to reception of an instruction to display a display target screen is described, but the present disclosure is not limited to this. For example, there is a case where, in a state where a target screen on which UI components for executing predetermined functions is displayed, a management server that centrally manages the image processing apparatus 1 performs control to change a setting of a restricted function. In addition, there is another case where the management server makes a setting to add or delete a function executable on the target screen. In such a case, an instruction to update the target screen is input to the image processing apparatus 1 and the aforementioned processing in the flowchart may be started in response to the input. Here, in the case of updating the target screen, a warning message may be displayed to the user.

Although the image processing apparatus is described as one example of the information processing apparatus, the foregoing embodiments can be applied to any types of information processing apparatuses. The foregoing embodiments are effective particularly for an information processing apparatus in which the display size of the display unit is relatively small and the layout region is limited.

Then, the foregoing embodiments are described by focusing on the UI components, and each UI component for a function on the screen can be referred to as an area for the function on the screen. Thus, in the foregoing embodiments, the processing of changing the size of the area for each function on the screen is performed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-066378, filed Apr. 14, 2023, which is hereby incorporated by reference wherein in its entirety.

What is claimed is:

1. An information processing apparatus comprising:
one or more memories storing instructions; and
one or more processors executing the instructions to:
display a first area for a first function and a second area for a second function in a predetermined size in a case where the first function and the second function are not restricted in a layout region where to place respective areas for a plurality of functions on a screen, and hide the first area and display the second area for the second function in a size larger than the predetermined size in a case where the first function is restricted and the second function is not restricted, wherein
the first function which is restricted is disabled from being executed in the information processing apparatus.

2. The information processing apparatus according to claim 1, wherein the size of the second area is changed depending on the number of the second areas to be displayed in the layout region.

3. The information processing apparatus according to claim 1, wherein
in a case where the restriction on the first function is canceled, the second area is displayed in the predetermined size in the layout region and the first area is displayed in the layout region.

4. The information processing apparatus according to claim 3, wherein
in the case where the restriction on the first function is canceled, the first area is displayed in the predetermined size.

5. The information processing apparatus according to claim 1, wherein
in a case where all the functions are restricted, a predetermined message is displayed on the screen.

6. The information processing apparatus according to claim 5, wherein the predetermined message is displayed in the layout region.

7. The information processing apparatus according to claim 1, wherein in a case where the second area is displayed in the size larger than the predetermined size, a predetermined message is displayed on the screen.

8. The information processing apparatus according to claim 1, wherein the layout region is a region in a fixed size.

9. The information processing apparatus according to claim 1, wherein the one or more processors further execute an instruction to make a setting to add or delete the function executable on the screen.

10. The information processing apparatus according to claim 9, wherein after the setting to add or delete the function is made, a display is performed by using information after the setting.

11. The information processing apparatus according to claim 1, wherein the function is restricted depending on a mode in which the information processing apparatus operates.

12. The information processing apparatus according to claim 1, wherein
the first function is in a state where not part of the first function but the entire first function is disabled from being executed in the information processing apparatus.

13. The information processing apparatus according to claim 1, wherein
the first function which is restricted is set by an administrator of the information processing apparatus so as to be in a state where the first function is disabled from being executed in the information processing apparatus.

14. The information processing apparatus according to claim 1, wherein
the first function and the second function are any two of a function of setting an own mail address as a destination to which scan data is sent, a function of setting a personal folder as a destination to which scan data is sent, and a function of selecting a destination to which scan data is sent from an address book.

15. The information processing apparatus according to claim 1, wherein
the first function and the second function are any two of a copy function, a scan function, and a FAX function.

16. An information processing apparatus comprising:
one or more memories storing instructions; and
one or more processors executing the instructions to:
in a case of a first mode in which no function is restricted, display a first screen on which a first area for a first function and a second area for a second function are placed in a predetermined size in a layout region of a display screen; and
in a case of a second mode in which the first function is restricted and the second function is not restricted, display a second screen on which the first area is hidden and the second area is placed in a size larger than the predetermined size in the layout region of the display screen, wherein
the first function which is restricted is disabled from being executed in the information processing apparatus.

17. The information processing apparatus according to claim 16, wherein
on the first screen in the case of the first mode in which no function is restricted, a third area for a third function is further placed in the layout region, and on the second screen in the case of the second mode, the third area is placed in at least part of an area where to place the second area in the layout region in the first mode.

18. A display control method comprising the steps of:

displaying a first area for a first function and a second area for a second function in a predetermined size in a case where the first function and the second function are not restricted in a layout region where to place respective areas for a plurality of functions on a screen, and hiding the first area and displaying the second area for the second function in a size larger than the predetermined size in a case where the first function is restricted and the second function is not restricted, wherein the first function which is restricted is disabled from being executed in the information processing apparatus.

* * * * *